US009002262B1

(12) United States Patent
Kuo

(10) Patent No.: US 9,002,262 B1
(45) Date of Patent: Apr. 7, 2015

(54) MULTI-MODE WIDEBAND ANTENNA

(71) Applicant: Amazon Technologies, Inc., Reno, NV (US)

(72) Inventor: Jerry W. Kuo, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 153 days.

(21) Appl. No.: 13/685,582

(22) Filed: Nov. 26, 2012

(51) Int. Cl.

| | |
|---|---|
| ***H04B 7/24*** | (2006.01) |
| ***H01Q 1/50*** | (2006.01) |
| ***H04B 1/04*** | (2006.01) |

(52) U.S. Cl.
CPC ... *H01Q 1/50* (2013.01); *H04B 1/04* (2013.01)

(58) Field of Classification Search
CPC .......................................................... H01Q 9/42
USPC ........ 455/39, 73, 562.1, 575.7; 343/702, 815, 343/833, 848, 860
See application file for complete search history.

(56) References Cited

U.S. PATENT DOCUMENTS

| | | | | |
|---|---|---|---|---|
| 7,136,019 B2 * | 11/2006 | Mikkola et al. | ............... | 343/702 |
| 2010/0141536 A1 * | 6/2010 | Zhang et al. | .................. | 343/702 |

* cited by examiner

*Primary Examiner* — Tuan H Nguyen
(74) *Attorney, Agent, or Firm* — Lowenstein Sandler LLP

(57) ABSTRACT

Methods and systems for extending a bandwidth of a multi-mode wideband antenna of a user device are described. A multi-mode wideband antenna includes a single radio frequency (RF) feed coupled to a first element, and a second element coupled to the first element and a ground plane. The first element is to operate as a feeding structure to a parasitic grounding element that is coupled to the ground plane, but is not conductively connected to the RF feed. The multi-mode wideband antenna is configured to provide multiple resonant modes.

24 Claims, 9 Drawing Sheets

MULTI-MODE WIDEBAND ANTENNA

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

The conventional antenna usually has only one resonant mode in the lower frequency band and one resonant mode in the high-band. One resonant mode in the lower frequency band and one resonant mode in the high-band may be sufficient to cover the required frequency band in some scenarios, such as in 3G applications. 3G, or 3rd generation mobile telecommunication, is a generation of standards for mobile phones and mobile telecommunication services fulfilling the International Mobile Telecommunications-2000 (IMT-2000) specifications by the International Telecommunication Union. Application services include wide-area wireless voice telephone, mobile Internet access, video calls and mobile TV, all in a mobile environment. The required frequency bands for 3G applications may be GSM850/EGSM in low-band and DCS/PCS/WCDMA in high-band. The 3G band is between 824 MHz and 960 MHz. Long Term Evolution (LTE) and LTE Advanced (sometimes generally referred to as 4G) bands are communication standards that have been standardized by the 3rd Generation Partnership Project (3GPP). However, in order to extend the frequency coverage down to 700 MHz for 4G/LTE application, antenna bandwidth needs to be increased especially in the low-band. There are two common LTE bands used in the United States from 704 MHz-746 MHz (Band 17) and from 746 MHz-787 MHz (Band 13). Conventional solutions increase the antenna size or use active tuning elements to extend the bandwidth. Alternatively, conventional solutions use separate antennas to achieve different frequency bands and use a switch to switch between the antennas. These solutions are not conducive to use in user devices, often because of the size of the available space for antennas within the device.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
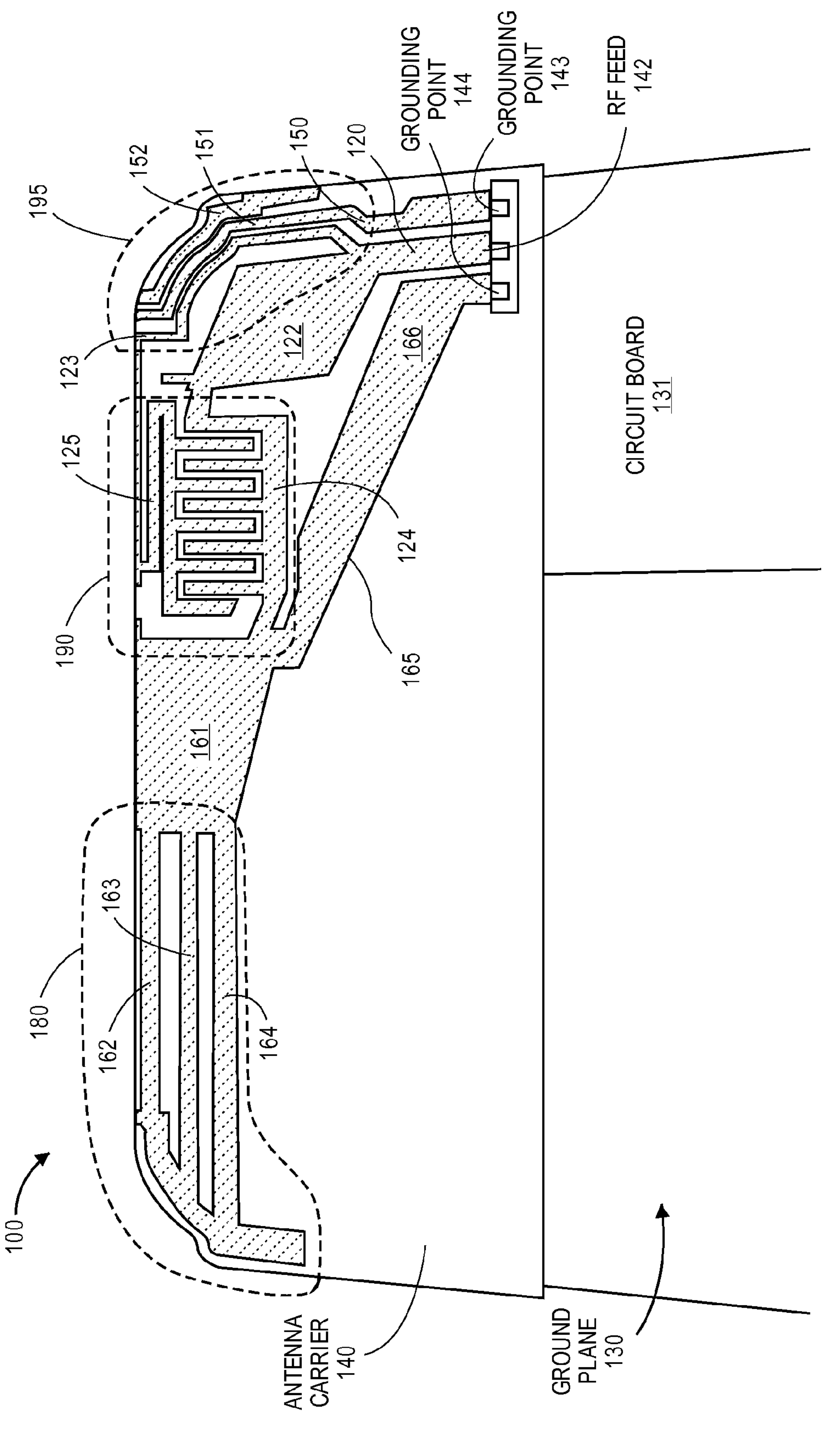
FIG. 1 illustrates one embodiment of a multi-mode wideband antenna.

Methods and systems for extending a bandwidth of a multi-mode wideband antenna of a user device are described. A multi-mode wideband antenna includes a single radio frequency (RF) feed coupled to a first element and a second element coupled to the first element and coupled to a ground plane. The first element is to operate as a feeding structure to a parasitic grounding element that is not conductively connected to the first element. The multi-mode wideband antenna is configured to operate in multiple resonant modes. In one embodiment, the multi-mode wideband antenna is configured to operate in four resonant modes, including two resonant modes in the low-band and two resonant modes in the high-band.

The user device may be any content rendering device that includes a wireless modem for connecting the user device to a network. Examples of such user devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

As described above, the conventional antenna usually has only one resonant mode in the lower frequency band and one resonant mode in the high-band. The embodiments described herein increase the bandwidth of the multi-mode wideband antenna by adding additional resonant modes, extending the frequency coverage. In one embodiment, the multi-mode wideband antenna extends the frequency coverage down to 700 MHz for use in 4G/LTE applications, as well as provides additional resonances in the high-band. In one embodiment, the first element of the multi-mode wideband antenna operates as a feeding structure to a parasitic grounding element disposed near the first element. The multi-mode wideband antenna has a single RF feed that drives the first element as an active or driven element and the parasitic grounding element as a passive, parasitic element that is fed by the first element. By coupling the drive first element (and the second element) and the passive element, two resonant modes can be created in the lower band and two or more resonant modes can be created in the higher band. The proposed multi-mode wideband antenna uses two resonant modes to cover 700 MHz-960 MHz to cover the both the 3G band and the LTE band in a single RF feed. It should be noted that the proposed embodiments can be used to cover LTE band 13 and LTE band 17 simultaneously. The embodiments described herein are not limited to use in 3G and LTE bands, but could be used to increase the bandwidth of a multi-band frequency in other bands. For example, in one embodiment, another one of the antenna structures is configured to operate between 700 MHz and 960 MHz in a low-band and between 1.71 and 2.17 GHz in a high-band. In other embodiments, the antenna structure is configured to operating in one or more of the following frequency bands Long Term Evolution (LTE) 700, LTE 2700, Universal Mobile Telecommunications System (UMTS) (also referred to as Wideband Code Division Multiple Access (WCDMA)) and Global System for Mobile Communications (GSM) 850, GSM 900, GSM 1800 (also referred to as Digital Cellular Service (DCS) 1800) and GSM 1900 (also referred to as Personal Communication Service (PCS) 1900). The antenna structure may provide multiple resonant modes, for example, a first low-band mode, a second low-band mode, a first high-band mode, and a second high-band mode. References to providing one or more resonant modes indicates that the characteristics of the antenna structure, such as length, position, width, proximity to other elements, ground, or the like, decrease a reflection coefficient certain frequencies to create the one or more resonant modes as would be appreciated by one of ordinary skill in the art. Also, some of these characteristics can be modified to tune the frequency response at those resonant modes, such as to extend the bandwidth, increase the return loss, or the like. The embodiments described herein provide a multi-mode wideband antenna to be coupled to a single RF feed and does not use any active tuning to achieve the extended bandwidths. The embodiments described herein also provide a multi-mode wideband antenna with increased bandwidth in a size that is conducive to being used in a user device.

FIG. 1 illustrates one embodiment of a multi-mode wideband antenna 100 including a first element 120 and second element 160 and a parasitic grounding element 150. In this embodiment, the multi-mode wideband antenna 100 is fed at the single RF feed 142 at the first element 120 and the parasitic grounding element 150 is a parasitic element. A parasitic element is an element of the multi-mode wideband antenna 100 that is not driven directly by the single RF feed 142. Rather, the single RF feed 142 directly drives another element of the multi-mode wideband antenna (e.g., the first element 120), which parasitically induces a current on the parasitic element. In particular, by directly inducing current on the other element by the single RF feed 142, the directly-fed element radiates electromagnetic energy, which causes another current on the parasitic element to also radiate electromagnetic energy, in multiple resonant modes. In the depicted embodiment, the parasitic grounding element 150 is parasitic because it is physically separated from the first element 120 that is driven at the single RF feed 142. The driven first element 120 parasitically excites the current flow of the parasitic grounding element 150. In one embodiment, the parasitic grounding element 150 and first element 120 can be physically separated by a gap. Alternatively, other antenna configurations may be used to include a driven element and a parasitic element. The dimensions of the first element 120, second element 160, and the parasitic grounding element 150 may be varied to achieve the desired frequency range as would be appreciated by one of ordinary skill in the art having the benefit of this disclosure, however, the total length of the antennas is a major factor for determining the frequency, and the width of the antennas is a factor for impedance matching. It should be noted that the factors of total length and width are dependent on one another.

In FIG. 1, the ground is represented as the radiation ground plane 130. The ground plane 130 may be a metal frame of the user device. The ground plane 130 may be a system ground or one of multiple grounds of the user device. The RF feed 142 may be a feed line connector that couples the multi-mode wideband antenna 100 to a feed line (also referred to as the transmission line), which is a physical connection that carriers the RF signal to and/or from the multi-mode wideband antenna 100. The feed line connector may be any one of the three common types of feed lines, including coaxial feed lines, twin-lead lines or waveguides. A waveguide, in particular, is a hollow metallic conductor with a circular or square cross-section, in which the RF signal travels along the inside of the hollow metallic conductor. Alternatively, other types of connectors can be used. In the depicted embodiment, the feed line connector is directly connected to first element 120 of the multi-mode wideband antenna 100, but is not conductively connected to the parasitic grounding element 150 of the multi-mode wideband antenna 100. However, the first element 120 is configured to operate as a feeding structure to the parasitic grounding element 150. That is the first element parasitically induces current at the parasitic grounding element 150 as described above.

In one embodiment, the multi-mode wideband antenna 100 is disposed on an antenna carrier 140, such as a dielectric carrier of the user device. The antenna carrier 140 may be any non-conductive material, such as dielectric material, upon which the conductive material of the multi-mode wideband antenna 100 can be disposed without making electrical contact with other metal of the user device. In another embodiment, the multi-mode wideband antenna 100 is disposed on, within, or in connection with a circuit board, such as a printed circuit board (PCB). In the depicted embodiment, a circuit board 131 is disposed on the ground plane 130, and the ground plane 130 may be a metal chassis. Alternatively, the multi-mode wideband antenna 100 may be disposed on other components of the user device or within the user device as would be appreciated by one of ordinary skill in the art having the benefit of this disclosure. It should be noted that the multi-mode wideband antenna 100 illustrated in FIG. 1 is a three-dimensional (3D) structure. However, as described herein, the multi-mode wideband antenna 100 may include two-dimensional (2D) structures, as well as other variations than those depicted in FIG. 1.

Using the first element 120, second element 160, and the parasitic grounding element 150, the multi-mode wideband antenna 100 can create multiple resonant modes using the single RF feed 142, such as four resonant modes. In one embodiment, the multi-mode wideband antenna 100 can be configured to create a resonant mode for LTE 700 band plus the penta-band. In telecommunications, the terms multi-band, dual-band, tri-band, quad-band, and penta-band refer to a device, such as the user device described herein, supporting multiple RF bands used for communication. In other embodiments, the antennas can be designed to cover an eight-band LTE/GSM/UMTS, the GSM850/900/1800/1900/UMTS penta-band operation, or the LTE700/GSM850/900 (698-960 MHz) and GSM 1800/190/UMTS/LTE2300/2500 (1710-2690 MHz operation. In the user device context, the purpose of doing so is to support roaming between different regions whose infrastructure cannot support mobile services in the same frequency range. These frequency bands may be Universal Mobile Telecommunication Systems (UMTS) frequency bands, GSM frequency bands, or other frequency bands used in different communication technologies, such as, for example, cellular digital packet data (CDPD), general packet radio service (GPRS), enhanced data rates for GSM evolution (EDGE), 1 times radio transmission technology (1xRTT), evaluation data optimized (EVDO), high-speed downlink packet access (HSDPA), WiFi, WiMax, etc.

In the depicted embodiment, the multi-mode monopole antenna 100 includes a first element 120, a second element 160 and a parasitic ground element 150. The first element 120 is coupled to the single RF feed 142. The second element 160 is coupled to grounding point 144, which is coupled to the ground plane 130. The parasitic ground element 150 is coupled to grounding point 143, which is coupled to the ground plane 130.

The second element 160 includes a first arm 165, a middle portion 161 and an arm portion 180 with three parallel traces 162, 163, 164. In other embodiments, two or more parallel traces may be used. The first arm 165 extends from the grounding point 144 towards the middle portion 161 and the three parallel traces 162-164 extend out from the middle portion 161 at a distal end of the second element 160. The distal end is the end that is farthest away from the grounding point 144. In one embodiment, the middle portion 161 has a rectangular shape and the three parallel traces 162-164 extend out a side of the rectangular shape, and the first arm coupled at an opposite side, such as at the lower right corner as depicted in FIG. 1. The three parallel traces 162-164 form two floating pieces. In other embodiments, two or more traces can be used. Also, in other embodiments, the traces do not necessarily need to join again at the distal end as depicted in FIG. 1. In the depicted embodiment, the arm portion 180 also includes a stub that extends towards the ground plane 130 to add additional length to the second element 160. Also, as described below with respect to FIG. 6, the second element 160 also includes additional arms that extend to the topside of the antenna carrier 140.

Figure 6:
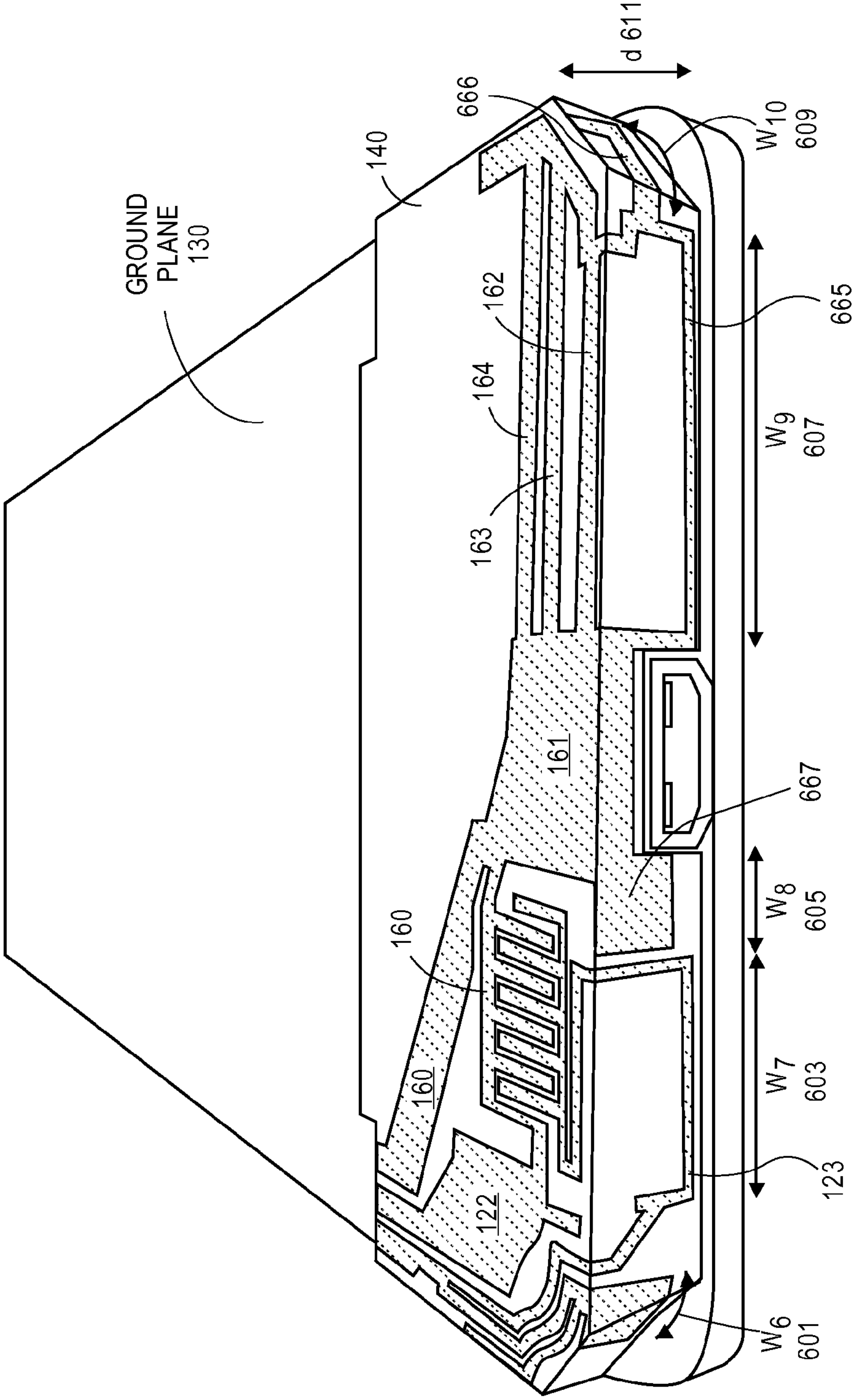
FIG. 6 illustrates another top perspective view of the multi-mode wideband antenna of FIG. 1 with additional dimensions.

The first element 120 includes two main sections. A first section includes a feed trace, a widened section 122, having a diamond shape, and a first coupler section 144. The widened section 122 is wider than the feed trace and the first coupler section 144. The feed trace extends from the RF feed 142 towards a first end of the widened section 122 and the first coupler section 124 extends from a second end of the widened section 122 to where the first section is conductively connected to the distal end of the first arm 165 of the second element. The phrase "conductively connected," as used herein, indicates that the two antenna elements have a connection between them that allows for conduction of current. For example, one element can be physically connected to the other element and this physical connection allows current to flow between the two antenna elements. In other contexts, for purposes of comparison, two elements can be coupled or form a "coupling," without being physically connected. For example, two antenna elements can be disposed in a way to form a capacitive coupling between the two antenna elements or an inductive coupling between the two antenna elements. The second section of the first element 120 includes a second monopole element 123 and a second coupler section 125. The second monopole element 123 extends from the feed trace and the second coupler section 125 extends from a distal end of the second monopole element 123. The first coupler section 124 and the second coupler section 125 are disposed to form a coupling 190 between the first section and the second section. The second monopole element 123 extends to the topside of the antenna carrier 140 and then returns back to the front side of the antenna carrier 140 where the second coupler section 125 is disposed. It should also be noted that other shapes for the first element 120 are possible. For example, the second monopole element 123 can have various bends, such as to accommodate placement of other components, such as a speakers, microphones, USB ports (as shown in FIG. 6). Also, the first element 120 includes a stub that extends the second side of the widened section 122. Also, as described below, the second monopole element 123 extends along a portion of the parasitic grounding element 150 to form a coupling 195 between the first element 120 and the parasitic grounding element 150.

The parasitic ground element 150 is a folded monopole element. The folded monopole element includes a first portion 151 that is laid out at least partially in parallel to a portion of the second monopole element 123 in a first direction until a first fold (on a topside of the antenna carrier 140 illustrated in FIG. 6) and a second portion 152 that folds back towards the ground plane 130 from the first fold and is laid out at least partially in parallel to the first portion 151 for a specified distance from the first fold. Alternatively, the first portion 151 and second portion 152 can be disposed next to each other and the second monopole element 123 in other configurations as would be appreciated by one of ordinary skill in the art. It should also be noted that a "fold" refers to a bend, a corner, or other change in direction of the antenna element. For example, the fold may be where one segment of an antenna element changes direction in the same plane or in a different plane. Typically, folds in antennas can be used to fit the entire length of the antenna within a smaller volume of a user device.

As described above, the first portion 151 and the monopole element 123 of the first element 120 form the coupling 195. In the depicted embodiment, the parasitic grounding element 150 is a folded monopole element, but could be other types of antenna and have different shapes as would be appreciated by one of ordinary skill in the art having the benefit of this disclosure.

Strong resonances are not easily achieved within a compact space within user devices, especially with the spaces on smart phones and tablets. The structure of the multi-mode wideband antenna 100 provides multiple strong resonances at 700 MHz to 960 MHz and 1.7 GHz to 2.17 GHz. The couplings 190, 195 (illustrated in FIG. 1), and 370 (illustrated in FIG. 3) can be designed to contribute to these resonances. Strong resonances, as used herein, refer to a significant return loss at those frequency bands, which is better for impedance matching to 50-ohm systems. These multiple strong resonances can provide an improved antenna design as compared to conventional designs.

Figure 2:
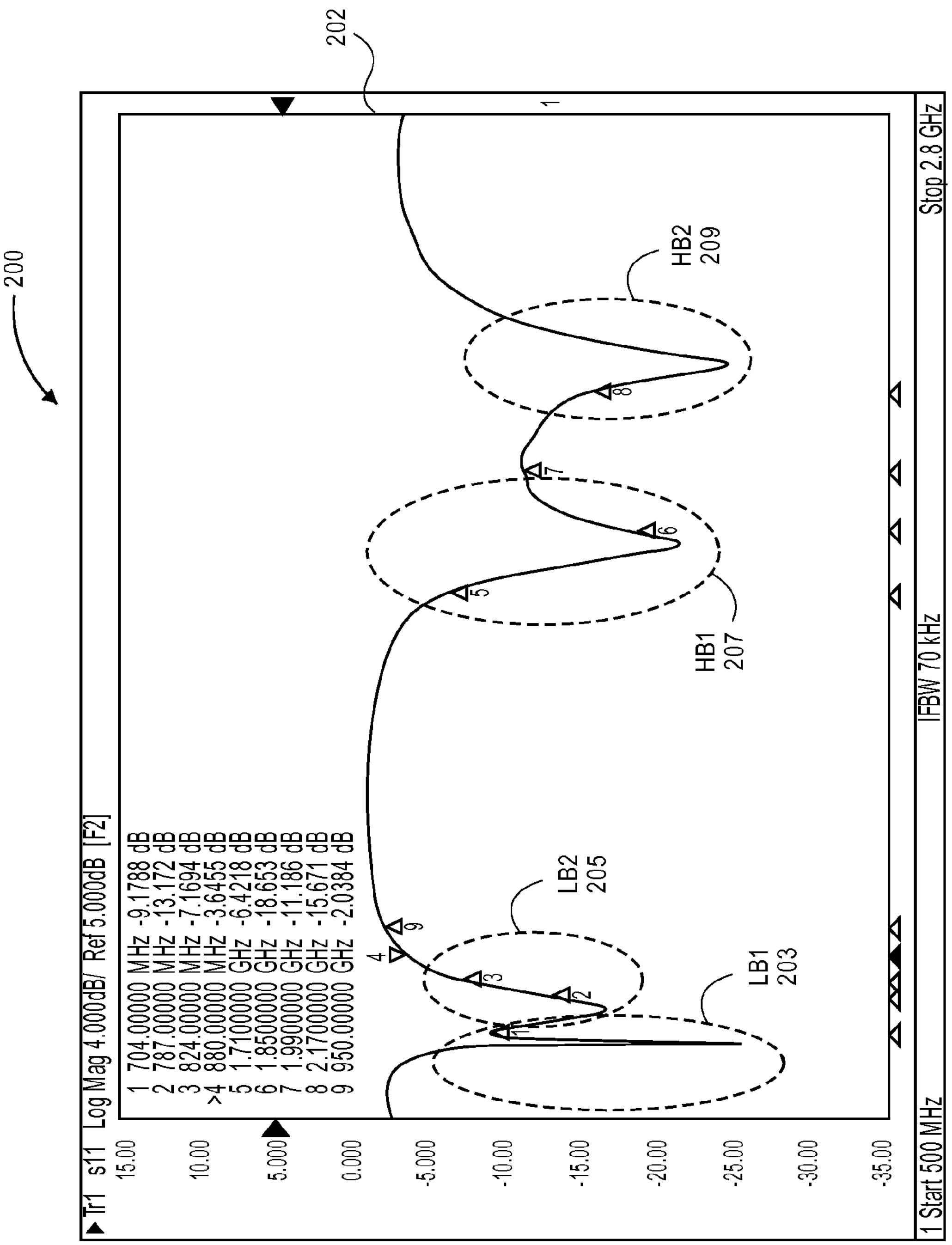
FIG. 2 is a graph of measured reflection coefficient of the multi-mode wideband antenna of FIG. 1 according to one embodiment.

FIG. 2 is a graph 200 of measured reflection coefficient 202 of the multi-mode wideband antenna 100 of FIG. 1 according to one embodiment. The graph 200 shows the measured reflection coefficient (also referred to S-parameter or $|S11|$) of the structure of the multi-mode wideband antenna 100 of FIG. 1.

Conventional WAN antennas may provide 704 to 983 MHz for LTE bands, GSM 850/900 bands and 1.710 to 2.17 GHz to cover DCS, PCS, WCDMA bands. However, as described above, these conventional WAN antennas have active switching elements to switch between these antennas in order to hop between the LTE bands and GSM 850/900 bands. These active switching elements involved complicated circuits to intelligently switch and operates at those frequency bands. For example, one conventional switchable antenna is developed by Pulse Electronics. This switchable antenna for mobile connected personal computers (PCs) enables four resonant modes for low-band: 700-750 MHz (LTE low), 750-790 MHz (LTE high), 820-900 MHz (GSM850), and 880-960 MHz (GSM900), and covers multiple resonant modes for high-band applications 1800/1900/2100 with a switch that is implemented directly from the device's display area. Another conventional antenna is a planar inverted F antenna (PIFA), which is a type of quarter-wave half-patch antenna. Another conventional WAN antenna may provide LTE and EVDO antennas an active switching circuit to switch between the two. These conventional designs that usually involved monopole structure (a single meandered line) (e.g., monopole or PIFA) with other parasitic structures could not provide good matching in compact spaces. However, the embodiments described herein provide better matching within the compact space associated with the user device.

In contrast, the embodiments described herein uses a single RF feed for the same frequency bands, but can be more easily integrated into the user device. The multi-mode wideband antenna 100 covers approximately 700 MHz to 960 MHz in a low-band and 1.71 GHz to 2.7 GHz in a high-band. The multi-mode wideband antenna 100 provides four resonant modes, including a LB1 203, LB2 205, HB1 207 and HB2 209. That is the multi-mode wideband antenna 100 decreases the reflection coefficient at the corresponding frequencies to create or form LB1 203, LB2 205, HB1 207 and HB2 209. LB1 203 is approximately at 700 MHz. LB2 205 is approximately at 1 GHz. HB1 207 is approximately at 1.5 GHz. HB2 209 is approximately at 2.2 GHz. As described herein, other resonant modes may be achieved. Also, the two sets of low and high resonances can be synthesized and combined to meet LTE and penta-band bandwidths. Alternatively, the two sets can be synthesized and combined to meet LTE and quad- or tri-band bandwidths as well.

Low profile multi-mode antennas are especially attractive to compact, conformal user devices, such as mobile devices. However, as fundamental antenna theory states the antenna bandwidth is proportional to the effective radiation volume, the antenna performance (e.g., bandwidth and efficiency), and the quality factor is degraded by the constrained space given by the user device. This is expressed in Chu's limit as follows:

$$Qualityfactor \sim \frac{1}{B.W.} \sim 1/r^3$$

In other words, the size constraint could radically change the antenna design concept and methodology. For example, the embodiments described below describe 3D structures that can improve the quality factor of the antenna design. Embodiments of the 3D structures provide a compact designed 3D structure to cope with the compact user device environment.

In the depicted embodiment, there are four resonate modes created by the first element 120, second element 160 and the parasitic grounding element 150. In one embodiment, the first element 120 and the second element 160 provide a first resonant mode and a second resonant mode. More specifically, the first element 120 and the second element 160 decrease a reflection coefficient at certain frequencies to create the first resonant mode and at the second resonant mode. In particular, the inductive coupling 190, formed by the first coupler section 124 and the second coupler section 125, and the second monopole section 123 that extends back to the RF feed 142 contribute to the first resonant mode. Also, the arm portion 180 with the three parallel traces 162-164 contributes to the second resonant mode. The parasitic grounding element 150 is configured to provide a third resonant mode. More specifically, the parasitic grounding element 150 decreases the reflection coefficient at the third resonant mode. A fourth resonant mode can be created by the third harmonic of the second element 160. In particular, the widened middle portion 161 of the second element 160 contributes to the third harmonic. Also, the inductive coupling 190 formed by the first coupler section 124 and the second coupler section 125 may also contribute to the fourth resonant mode. In one embodiment, the first resonant mode 203 is in a range between 680 MHz and 705 MHz, the second resonant mode 205 is in a range between 700 MHz to 950 MHz, the third resonant mode 207 is in a range between 1.71 GHz and 2 GHz, and the fourth resonant mode 209 is in a range between 1.91 GHz and 2.43 GHz. It should also be noted that the first, second, third and fourth notations on the resonant modes are not be strictly interpreted to being assigned to a particular frequency, frequency range, or elements of the multi-mode wideband antenna. Rather, the first, second, third, and fourth notations are used for ease of description. Alternatively, other orders may be achieved as would be appreciated by one of ordinary skill in the art having the benefit of this disclosure.

In another embodiment, the first element 120, second element 160 and the parasitic grounding element 150 can be configured to create three resonant modes or more than four resonant modes. In one embodiment, the multi-mode wideband antenna 100 can be designed to operate in the following target bands: 1) Verizon LTE band: 746 to 787 MHz; 2) US 850 (band 5): 824 to 894 MHz; 3) GSM900 (band 8): 880 to 960 MHz; 4) GSM 1800/DCS: 1.71 to 1.88 GHz; 5) US1900/PCS (band 2): 1.85 to 1.99 GHz; and 6) WCDMA band I (band 1): 1.92 to 2.17 GHz. These resonance bandwidths may be characterized by VNA measurements with about −5 dB bandwidth (BW). Alternatively, the multi-mode wideband antenna 100 can be designed to operate in different combinations of frequency bands as would be appreciated by one of ordinary skill in the art having the benefit of this disclosure.

Figure 3:
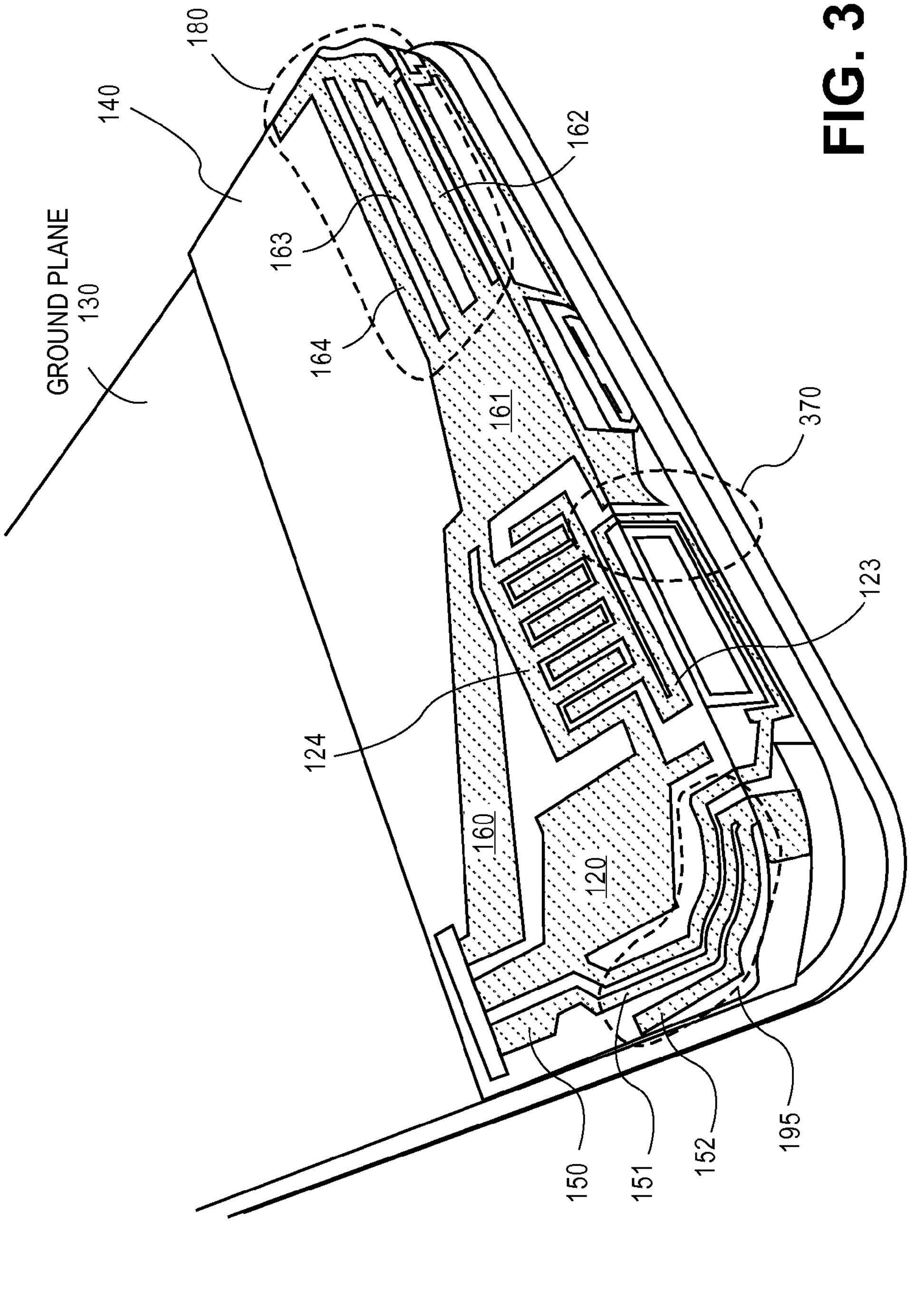
FIG. 3 illustrates a top perspective view of the multi-mode wideband antenna of FIG. 1 according to one embodiment.

FIGS. 3-6 illustrate different views of the multi-mode wideband antenna 100 of FIG. 1. FIG. 3 illustrates a top perspective view of the multi-mode wideband antenna 100. The first element 120, second element 160 and parasitic grounding element 150 are 3D structures that wrap around different sides of an antenna carrier 140. In particular, portions of the first element 150, second element 160 and the parasitic grounding element 150 are disposed on the topside of the antenna carrier 140. In other embodiments, portions of these elements could be disposed on the sides of the antenna carrier 140 as well. Also, as described above, these elements of the multi-mode wideband antenna 100 can be disposed to be coplanar as a 2D structure.

FIG. 3 also illustrates a third coupling 370 between the first element 120 and the second element 150. In particular, the monopole element 123 that warps around a component is disposed to have a portion near the base portion 161 of the second element 160.

Figure 4:
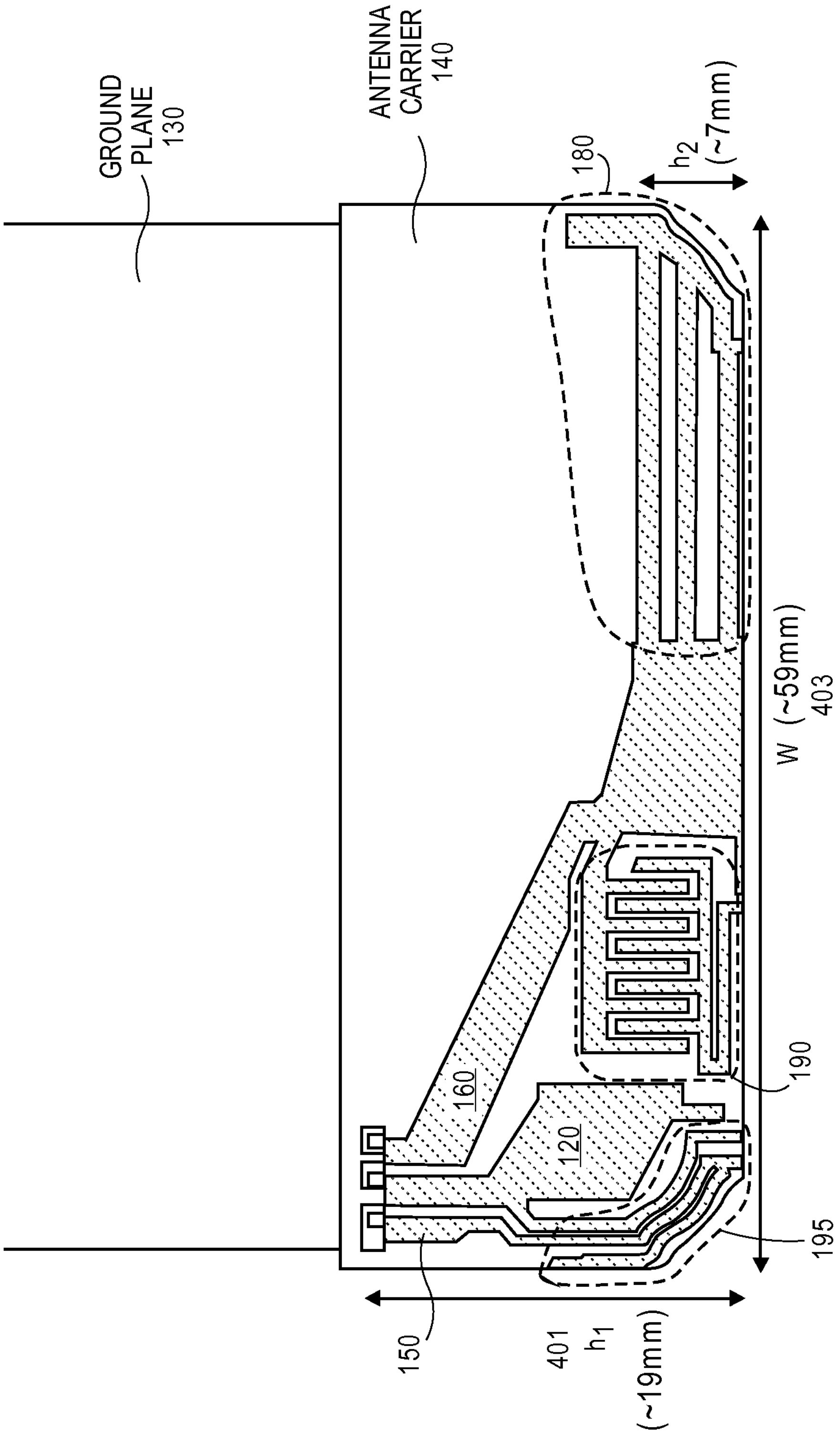
FIG. 4 illustrates a front view of the multi-mode wideband antenna of FIG. 1 with overall dimensions.

FIG. 4 illustrates a front view of the multi-mode wideband antenna 100 of FIG. 1 with overall dimensions. FIG. 4 indicates some overall dimensions of the multi-mode wideband antenna 100. In particular, the multi-mode wideband antenna 100 has an overall height 401 (h1), an overall width 403 (W), and an overall depth (D) 611 (illustrated in FIG. 6). The overall height 401 may vary, but, in one embodiment, is about 19 mm. The overall width 403 may vary, but, in one embodiment, is about 59 mm. The overall depth 611 may vary, but, in one embodiment, is about 7 mm. The arm portion 180 may have a height (h2) 405 of 7 mm. The stub that extends from the arm portion 180 towards the ground plane 130 could add to the height (h2) 405. It should be noted that effective volume of the multi-mode wideband antenna 100 may be 6 mm in effective height, 59 an effective width, and 7 mm in effective depth. The effective height may be less than the overall height because the ground plane 130 is disposed under the antenna carrier by a specified distance as would be appreciated by one of ordinary skill in the art having the benefit of this disclosure.

Figure 5:
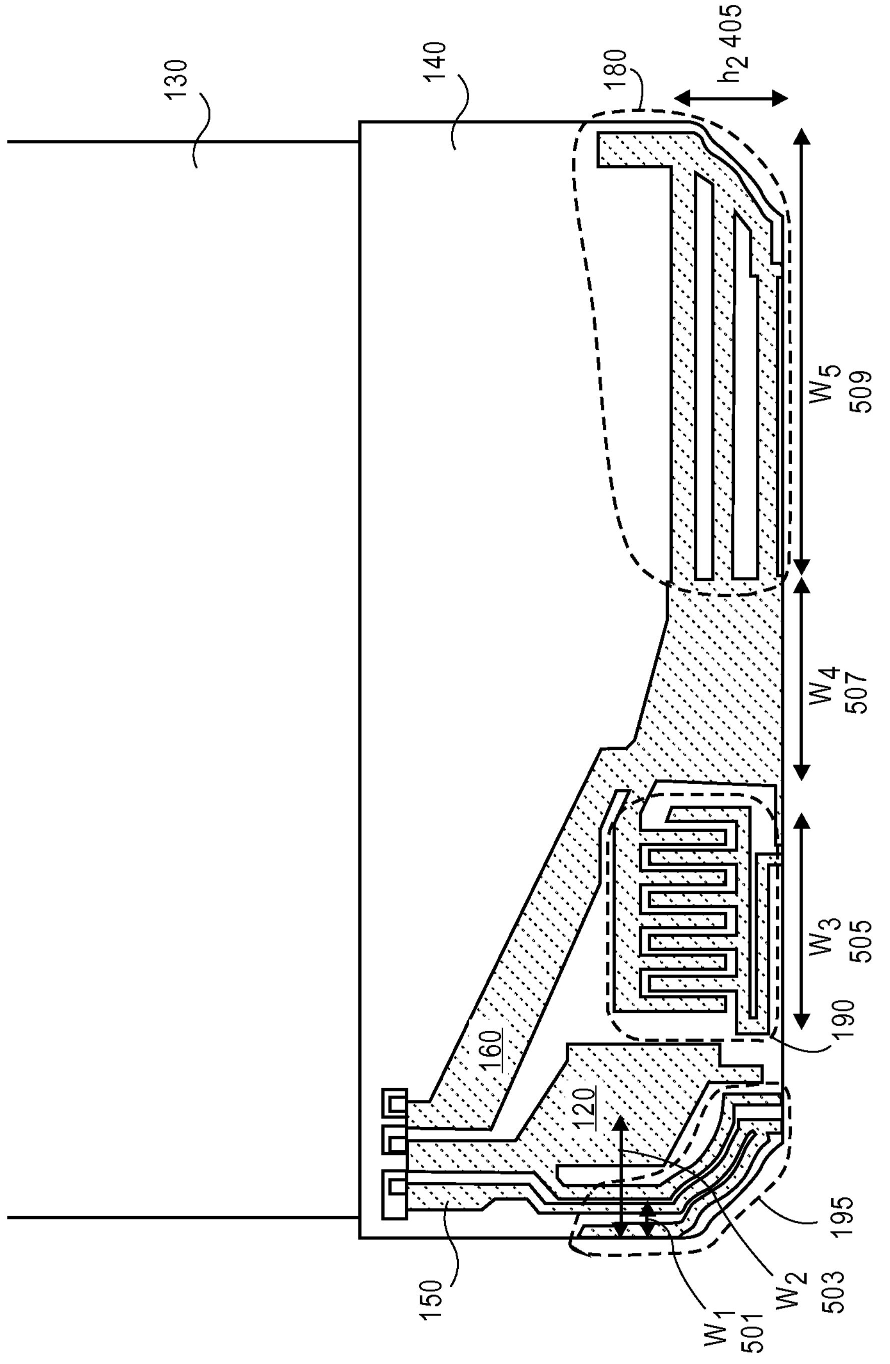
FIG. 5 illustrates another front view of the multi-mode wideband antenna of FIG. 1 with additional dimensions.

FIG. 5 illustrates another front view of the multi-mode wideband antenna 100 of FIG. 1 with additional dimensions.

As described above, the height (h2) 405 of the arm portion 180 is about 6-7 mm. The arm portion 180 may have a width (W5) 509 of about 24 mm. The parasitic grounding element 150 has a width (W1) 501 where the first portion 151 and the second portion 152 overlap for a first distance, and a width (W2) 503 from the edge of the second portion 152 and the edge of the first portion 151 at where it wraps around to the topside of the antenna carrier 140. In this embodiment, the width W1 501 is about 2.5 mm and the width W2 503 is about 6.55 mm. The first coupler section and the second coupler section that form the coupling 190 has a width (W3) 505 of about 11 mm. Similarly, the base portion 621 has a width (W4) 507 of about 11 mm.

FIG. 6 illustrates another top perspective view of the multi-mode wideband antenna 100 of FIG. 1 with additional dimensions. This view illustrates an extension portion of the first portion 151 and the second portion 152 of the parasitic ground element 150. This extension portion has a width (W6) of about 2.5 mm. The monopole element 123 of the first element 120 has a portion on the topside of the antenna carrier 140 with a width (W7) 603. The base portion 161 has an extension area 667 on the topside of the antenna carrier 140 with a width (W8) 605. The arm portion 180 has additional arms 665, 666 on the topside of the antenna carrier 140. The first arm 665 extends along the topside back towards the RF feed 142 and the second arm 666 extends along the topside towards a side of the antenna carrier 140. The second arm 666 has a width (W10) 609 of about 6 mm. The second arm 665 also has a stub that extends back towards the front side of the antenna carrier 140. A point at which the two arms 665, 666 extends may be at a width (W9) 607 of about 18 mm.

Figure 7:
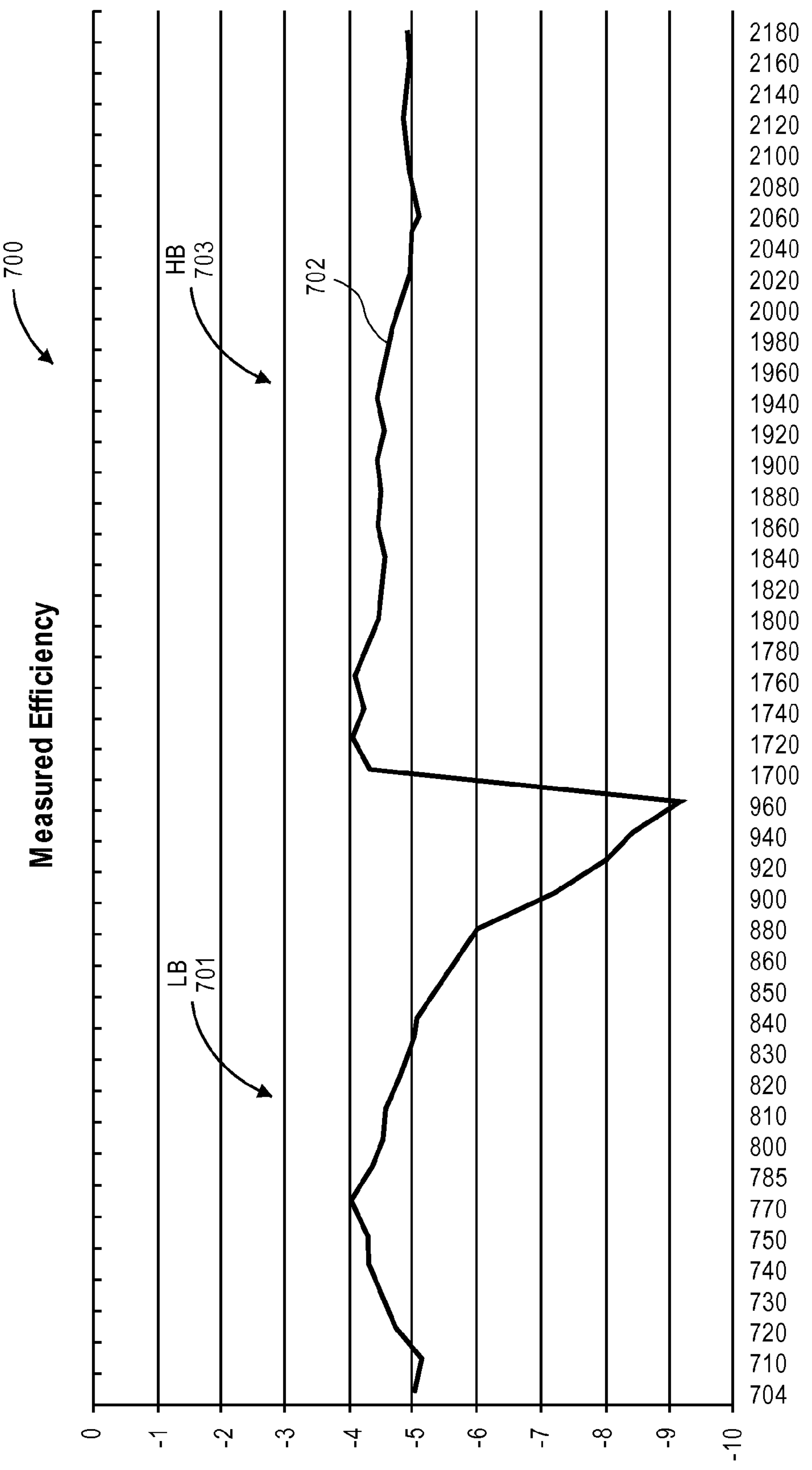
FIG. 7 is a graph of measured efficiency of the multi-mode wideband antenna according to one embodiment.

FIG. 7 is a graph 700 of measured efficiency of the multi-mode wideband antenna 100 according to one embodiment. The graph 700 illustrates the total efficiency 702 over a frequency range in a low-band 701 and in a high-band 703. The graph 700 illustrates that the multi-mode wideband antenna 100 is a viable antenna for the frequency range in a low-band 701 between 700 MHz and 960 MHz, and in a high-band 703 between 1.7 GHz and 2.17 GHz.

As would be appreciated by one of ordinary skill in the art having the benefit of this disclosure the total efficiency of the antenna can be measured by including the loss of the structure (e.g., due to mismatch loss), dielectric loss, and radiation loss. The efficiency of the antenna can be tuned for specified target bands. For example, the target band can be Verizon LTE band and the GSM850/900 band, and the multi-mode wideband antenna 100 can be tuned to optimize the efficiency for this band as well as for other bands, such as DCS, PCS, and WCDMA bands. The efficiency of the multi-mode wideband antenna may be done by adjusting dimensions of the 3D structure, the gaps between the elements of the structure, or a combination of both. Similarly, 2D structures can be modified in dimensions and gaps between elements to improve the efficiency in certain frequency bands as would be appreciated by one of ordinary skill in the art having the benefit of this disclosure. It should also be noted that the antennas described herein may be implemented with two-dimensional geometries, as well as three-dimensional geometries as described herein.

Figure 8:
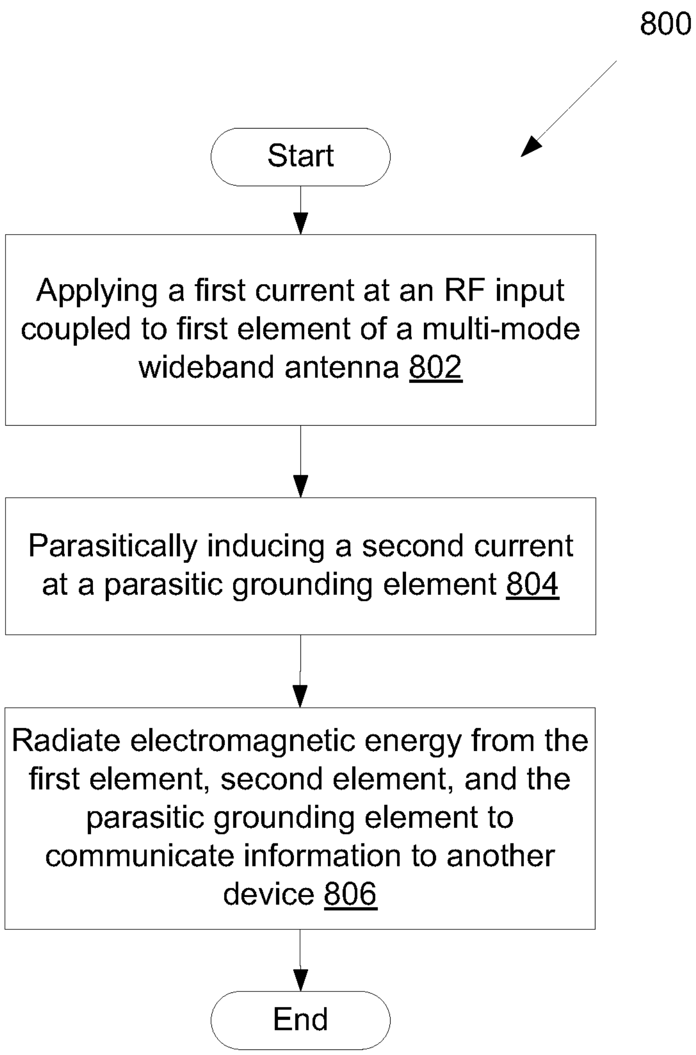
FIG. 8 is a flow diagram of an embodiment of a method of operating a user device having a multi-mode wideband antenna according to one embodiment.

FIG. 8 is a flow diagram of an embodiment of a method 800 of operating a user device having a multi-mode wideband antenna according to one embodiment. In method 800, is a first current is applied at the RF feed coupled to a first element of an antenna structure (block 802). The antenna structure further includes a parasitic grounding element coupled to a ground plane and a second element coupled to the ground plane and coupled to a distal end of the first element. The first element includes a first section and a second section. A portion of the first section and a portion of the second section are disposed to form an inductive coupling between the first section and the second section. The second element comprises parallel traces disposed at a distal end of the second element. In response to applying the first current, the first element parasitically induces a second current at a parasitic grounding element that is not conductively connected to the first element (block 804). In response to the applied first current and the induced second current, electromagnetic energy is radiated from the first element, second element, and the parasitic grounding element (block 806). The electromagnetic energy forms a radiation pattern. The radiation pattern may be various shapes as would be appreciated by one of ordinary skill in the art having the benefit of this disclosure.

In one embodiment, a current is applied at the RF feed, which induces a surface current flow of the first element and the second element. The first element and second element parasitically induces a current flow of the parasitic grounding element. By inducing current flow at the parasitic grounding element, bandwidth of the multi-mode wideband antenna is increased. The antenna structure provides multiple resonant modes. In one embodiment, the antenna structure provides two resonant modes in the low-band and two resonant modes in the high-band. As described herein, the parasitic grounding element is physically separated from the first element by a gap.

Figure 9:
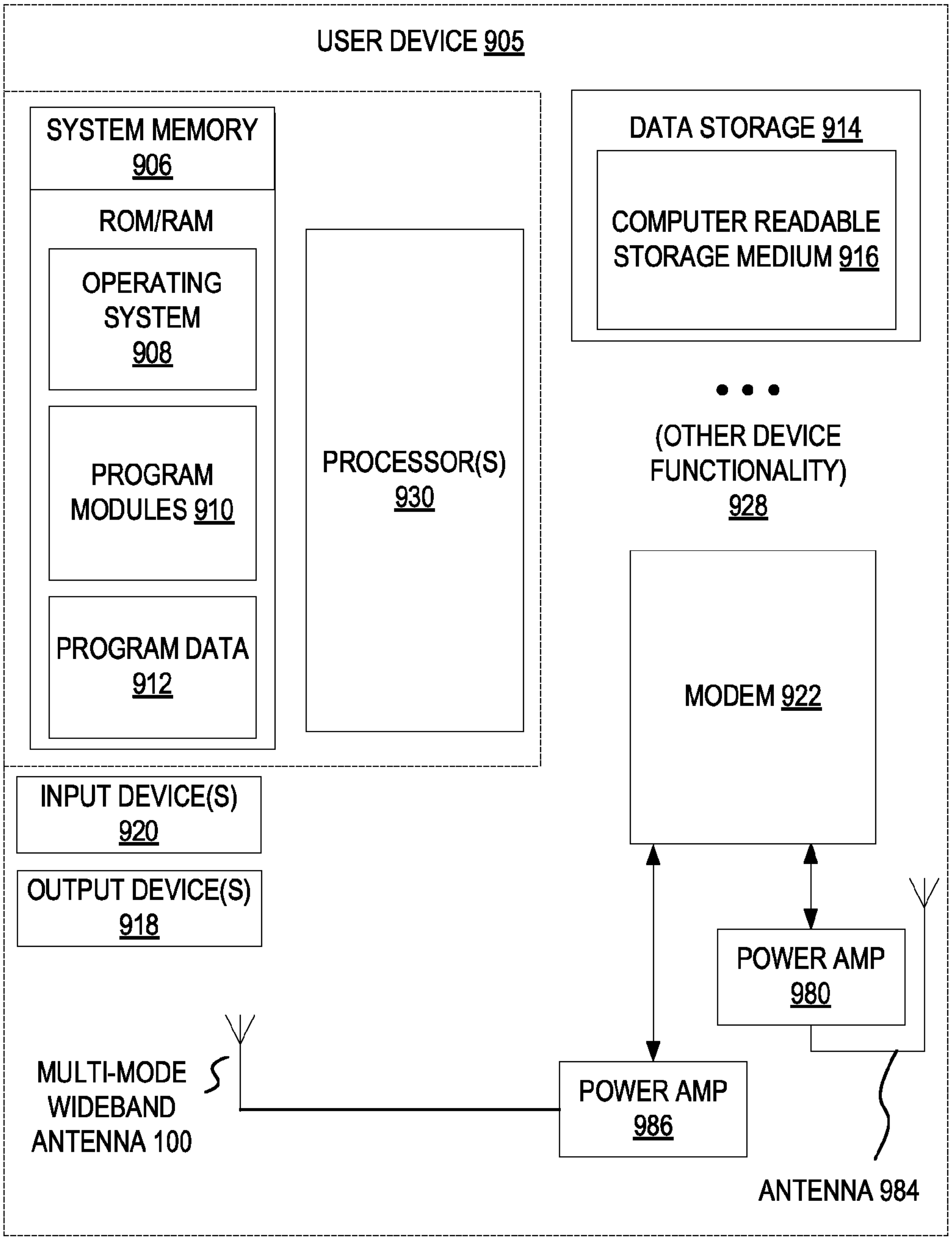
FIG. 9 is a block diagram of a user device having a multi-mode wideband antenna according to one embodiment.

FIG. 9 is a block diagram of a user device 905 having the multi-mode wideband antenna 100 of FIG. 1 according to one embodiment. The user device 905 includes one or more processors 930, such as one or more CPUs, microcontrollers, field programmable gate arrays, or other types of processing devices. The user device 905 also includes system memory 906, which may correspond to any combination of volatile and/or non-volatile storage mechanisms. The system memory 906 stores information, which provides an operating system component 908, various program modules 910, program data 912, and/or other components. The user device 905 performs functions by using the processor(s) 930 to execute instructions provided by the system memory 906.

The user device 905 also includes a data storage device 914 that may be composed of one or more types of removable storage and/or one or more types of non-removable storage. The data storage device 914 includes a computer-readable storage medium 916 on which is stored one or more sets of instructions embodying any one or more of the functions of the user device 905, as described herein. As shown, instructions may reside, completely or at least partially, within the computer readable storage medium 916, system memory 906 and/or within the processor(s) 930 during execution thereof by the user device 905, the system memory 906 and the processor(s) 930 also constituting computer-readable media. The user device 905 may also include one or more input devices 920 (keyboard, mouse device, specialized selection keys, etc.) and one or more output devices 918 (displays, printers, audio output mechanisms, etc.).

The user device 905 further includes a wireless modem 922 to allow the user device 905 to communicate via a wireless network (e.g., such as provided by a wireless communication system) with other computing devices, such as remote computers, an item providing system, and so forth. The wireless modem 922 allows the user device 905 to handle both voice and non-voice communications (such as communications for text messages, multimedia messages, media downloads, web browsing, etc.) with a wireless communication system. The wireless modem 922 may provide network connectivity using any type of digital mobile network technology including, for example, cellular digital packet data (CDPD), general packet radio service (GPRS), enhanced data rates for GSM evolution (EDGE), UMTS, 1 times radio transmission technology (1xRTT), evaluation data optimized (EVDO), high-speed downlink packet access (HSDPA), WiFi, etc. In other embodiments, the wireless modem 922 may communicate according to different communication types (e.g., WCDMA, GSM, LTE, CDMA, WiMax, etc) in different cellular networks. The cellular network architecture may include multiple cells, where each cell includes a base station configured to communicate with user devices within the cell. These cells may communicate with the user devices 905 using the same frequency, different frequencies, same communication type (e.g., WCDMA, GSM, LTE, CDMA, WiMax, etc), or different communication types. Each of the base stations may be connected to a private, a public network, or both, such as the Internet, a local area network (LAN), a public switched telephone network (PSTN), or the like, to allow the user devices 905 to communicate with other devices, such as other user devices, server computing systems, telephone devices, or the like. In addition to wirelessly connecting to a wireless communication system, the user device 905 may also wirelessly connect with other user devices. For example, user device 905 may form a wireless ad hoc (peer-to-peer) network with another user device.

The wireless modem 922 may generate signals and send these signals to power amplifier (amp) 980 or power amp 986 for amplification, after which they are wirelessly transmitted via the multi-mode wideband antenna 100 or antenna 984, respectively. Although FIG. 9 illustrates power amps 980 and 986, in other embodiments, a transceiver may be used for all the antennas 100 and 984 to transmit and receive. The antenna 984, which is an optional antenna that is separate from the multi-mode wideband antenna 100, may be any directional, omnidirectional or non-directional antenna in a different frequency band than the frequency bands of the multi-mode wideband antenna 100. The antenna 984 may also transmit information using different wireless communication protocols than the multi-mode wideband antenna 100. In addition to sending data, the multi-mode wideband antenna 100 and the antenna 984 also receive data, which is sent to wireless modem 922 and transferred to processor(s) 930. It should be noted that, in other embodiments, the user device 905 may include more or less components as illustrated in the block diagram of FIG. 9.

In one embodiment, the user device 905 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WiFi hotspot and a connection to a wireless carrier system. In one embodiment, the first wireless connection is associated with a first resonant mode of the multi-mode wideband antenna 100 that operates at a first frequency band and the second wireless connection is associated with a second resonant mode of the multi-mode wideband antenna 100 that operates at a second frequency band. In another embodiment, the first wireless connection is associated with the multi-mode wideband antenna 100 and the second wireless connection is associated with the antenna 984. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a single modem 922 is shown to control transmission to both antennas 100 and 984, the user device 905 may alternatively include multiple wireless modems, each of which is configured to transmit/receive data via a different antenna and/or wireless transmission protocol. In addition, the user device 905, while illustrated with two antennas 100 and 984, may include more or fewer antennas in various embodiments.

The user device 905 delivers and/or receives items, upgrades, and/or other information via the network. For example, the user device 905 may download or receive items from an item providing system. The item providing system receives various requests, instructions and other data from the user device 905 via the network. The item providing system may include one or more machines (e.g., one or more server computer systems, routers, gateways, etc.) that have processing and storage capabilities to provide the above functionality. Communication between the item providing system and the user device 905 may be enabled via any communication infrastructure. One example of such an infrastructure includes a combination of a wide area network (WAN) and wireless infrastructure, which allows a user to use the user device 905 to purchase items and consume items without being tethered to the item providing system via hardwired links. The wireless infrastructure may be provided by one or multiple wireless communications systems, such as one or more wireless communications systems. One of the wireless communication systems may be a wireless fidelity (WiFi) hotspot connected with the network. Another of the wireless communication systems may be a wireless carrier system that can be implemented using various data processing equipment, communication towers, etc. Alternatively, or in addition, the wireless carrier system may rely on satellite technology to exchange information with the user device 905.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 905 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 905 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. An electronic device comprising:
- a single radio frequency (RF) feed;
- a ground plane; and
- a multi-mode monopole antenna coupled to the single RF feed, wherein the multi-mode monopole antenna comprises:
  - a first element conductively coupled to the single RF feed at a feeding point, wherein the first element comprises a first sub-element and a second sub-element;
  - a second element conductively coupled to the ground plane at a first grounding point and conductively coupled to the first element at a distal point from the first grounding point, wherein the second element comprises:
    - a first arm coupled to the first grounding point;
    - a middle portion coupled to a distal end of the first arm, the distal end being a farthest end of the first arm from the first grounding point, wherein the distal point is located at a first side of the middle portion; and
    - a plurality of parallel traces that extend out from the middle portion at an opposite side from the first side where the first sub-element conductively connects to the first sub-element; and
  - a first monopole element coupled to the ground plane at a second grounding point, wherein the second sub-element is a second monopole element and is disposed to form a first coupling section between the second monopole element and the first monopole element.

2. The electronic device of claim 1, wherein the first monopole element is a folded monopole element.

3. The electronic device of claim 2, wherein the folded monopole element comprises: a first portion that is laid out at least partially in parallel to a portion of the second monopole element in a first direction until a first fold; and a second portion that folds back towards the ground plane from the first fold and is laid out at least partially in parallel to the first portion for a specified distance from the first fold, wherein the first portion and the second monopole element form the first coupling section.

4. An electronic device comprising:
- a single radio frequency (RF) feed;
- a ground plane; and
- a multi-mode monopole antenna coupled to the single RF feed, wherein the multi-mode monopole antenna comprises:
  - a first element coupled to the single RF feed;
  - a second element coupled to the ground plane; and
  - a first monopole element coupled to the ground plane, wherein the second element comprises a first arm, a middle portion, and a plurality of parallel traces, wherein the first arm extends from the ground plane towards the middle portion and the plurality of parallel traces extend out from the middle portion at a distal end of the second element, wherein the first element comprises a first section and a second section, wherein a distal end of the first section is conductively connected to a distal end of the first arm of the second element, and wherein the second section comprises a second monopole element disposed to form a first coupling section between the second monopole element and the first monopole element, wherein:

the first section of the first element further comprises a feed trace, a widened section, and a first coupler section, the widened section is wider than the feed trace and the first coupler section;

the second section further comprises a second coupler section;

the feed trace extends from the RF feed towards a first end of the widened section and the first coupler section extends from a second end of the widened section to where the first section is conductively connected to the distal end of the first arm of the second element;

the second monopole element extends from the feed trace and the second coupler section extends from a distal end of the second monopole element; and the first coupler section and the second coupler section are disposed to form a second coupling section.

5. The electronic device of claim 4, wherein the second coupling section is configured to form an inductive coupling between the first section and the second section.

6. An apparatus device comprising:

a radio frequency (RF) feed;

a ground plane; and an antenna structure comprising:

a first element conductively coupled to the RF feed at a feeding point, wherein the first element comprises a first section and a second section, and wherein a portion of the first section and a portion of the second section are disposed to form an inductive coupling between the first section and the second section;

a second element conductively coupled to the ground plane at a first grounding point and conductively coupled to the first element at a distal point from the first grounding point, wherein the second element comprises a plurality of extension traces; and a third element conductively coupled to the ground plane at a second grounding point, wherein the third element is a parasitic ground element.

7. The apparatus of claim 6, wherein the antenna structure is configured to operate in a plurality of resonant modes.

8. The apparatus of claim 7, wherein the plurality of resonant modes comprises a first low-band mode, a second low-band mode, a first high-band mode, and a second high-band mode.

9. The apparatus of claim 6, wherein the third element is a folded monopole element.

10. The apparatus of claim 9, wherein the folded monopole element comprises a first portion that is laid out at least partially in parallel to a portion of the second section of the first element in a first direction until a first fold and a second portion that folds back towards the ground plane from the first fold and is laid out at least partially in parallel to the first portion for a specified distance from the first fold, wherein the first portion and the first section of the first element form a second coupling between the folded monopole element and the first element.

11. The apparatus of claim 6, wherein the first section of the first element further comprises a feed trace, a widened section, and a first coupler section, and the second section further comprise a second coupler section, wherein the feed trace extends from the RF feed towards a first end of the widened section and the first coupler section extends from a second end of the widened section to a distal end of the first element where the first element is coupled to the second element, and wherein the second section of the first element extends from the feed trace and the second coupler section is disposed at a distal end of the second section of the first element, and wherein the first coupler section and the second coupler section are disposed to form the inductive coupling.

12. The apparatus of claim 6, wherein the antenna structure is configured to operate in a first frequency range of 700 MHz to 960 MHz, and wherein the antenna structure is configured to operate in a second frequency range of 1.7 GHz to 2.17 GHz.

13. The apparatus of claim 6, wherein the antenna structure is configured to operate in a low-band and in a high-band.

14. The apparatus of claim 6, wherein the antenna structure is configured to operate in a first standard wireless frequency band of the Long Term Evolution (LTE) band, and one or more of the following standard wireless frequency bands: Global System for Mobile Communications (GSM) 850 band, GSM 900 band, GSM 1800 band, GSM 1900 band, and Wideband Code Division Multiple Access (WCDMA) band.

15. The apparatus of claim 6, further comprising an antenna carrier upon which the antenna structure is disposed.

16. The apparatus of claim 15, wherein the ground plane is disposed on a first side of the antenna carrier and the antenna structure is disposed on at least two other sides of the antenna carrier.

17. The apparatus of claim 6, wherein an effective height of the antenna structure is 6 millimeters (mm) and an overall width of the antenna structure is 59 mm.

18. The apparatus of claim 17, wherein an overall depth of the antenna structure is 7 mm.

19. An apparatus device comprising:

a radio frequency (RF) feed;

a ground plane; and an antenna structure comprising:

a first element coupled to the RF feed, wherein the first element comprises a first section and a second section, and wherein a portion of the first section and a portion of the second section are disposed to form an inductive coupling between the first section and the second section;

a second element coupled to the ground plane and coupled to the first element, wherein the second element comprises a plurality of extension traces; and a third element coupled to the ground plane, wherein the third element is a parasitic ground element, wherein the inductive coupling is configured to decrease a reflection coefficient at a first resonant mode of a plurality of resonant modes, wherein the plurality of extension traces are configured to decrease the reflection coefficient at a second resonant mode of the plurality of resonant modes, wherein the third element is configured to decrease the reflection coefficient at a third resonant mode of the plurality of resonant modes, and wherein the first element and the second element are configured to decrease the reflection coefficient at a fourth resonant mode.

20. The apparatus of claim 19, wherein the antenna structure is configured to operate in a first frequency range of 700 MHz to 960 MHz for the first resonant mode and the second resonant mode, and wherein the antenna structure is configured to operate in a second frequency range of 1.7 GHz to 2.17 GHz for the third resonant mode and the fourth resonant mode.

21. A method of operating an electronic device, the method comprising applying a first current at a radio frequency (RF) feed coupled to a first element of an antenna structure, wherein the antenna structure further comprises a parasitic grounding element coupled to a ground plane and a second element coupled to the ground plane and coupled to a distal end of the first element, wherein the first element comprises a first section and a second section, wherein the first section of the first element further comprises a feed trace, a widened section, and a first coupler section, and the second section further comprise a second coupler section, wherein the feed trace extends from the RF feed towards a first end of the widened section and the first coupler section extends from a second end of the widened section to the distal end of the first element where the first element is coupled to the second element, and wherein the second section of the first element extends from the feed trace and the second coupler section is disposed at a distal end of the second section of the first element, and wherein the first coupler section and the second coupler section are disposed to form an inductive coupling between the first section and the second section, wherein the second element comprises a plurality of parallel traces disposed at a distal end of the second element;

in response to the applying the first current, parasitically inducing a second current at the parasitic grounding element of the antenna structure, wherein the parasitic grounding element is not conductively connected to the RF feed; and radiating electromagnetic energy from the first element, the second element and the parasitic grounding element to communicate information to another device in response to the first and second currents.

22. The method of claim 21, wherein said applying the first current and parasitically inducing the second current collectively provide a plurality of resonant modes.

23. The method of claim 22, wherein the plurality of resonant modes comprises a first low-band mode, a second low-band mode, a first high-band mode, and a second high-band mode.

24. The method of claim 23, wherein the first low-band mode and the second low-band mode operate between 700 MHz and 960 MHz, and the first high-band mode and the second high-band mode operate between 1.71 GHz and 2.7 GHz.

* * * * *